INVENTOR.
Joseph Richard Suchman
BY
Dressler, Goldsmith, Clement, Gordon & Ladd
ATTORNEYS.

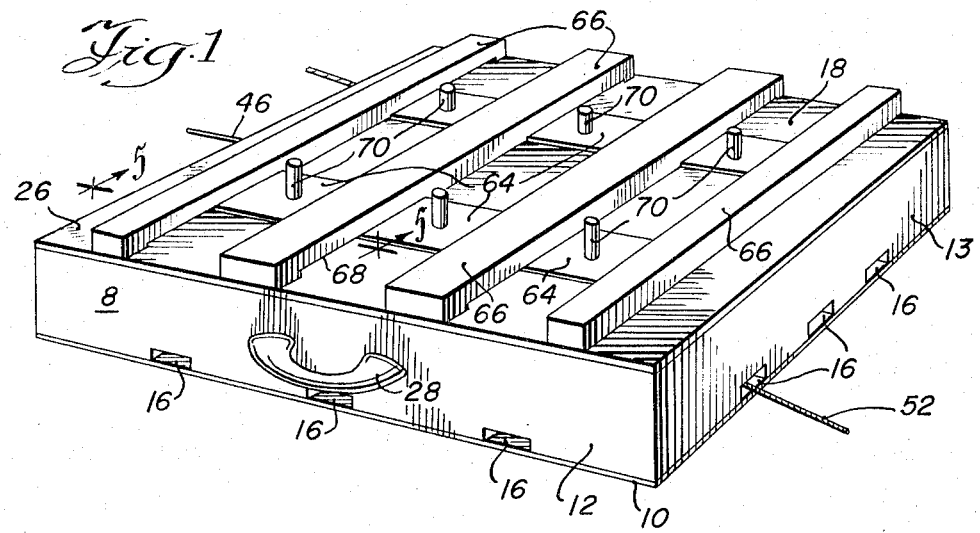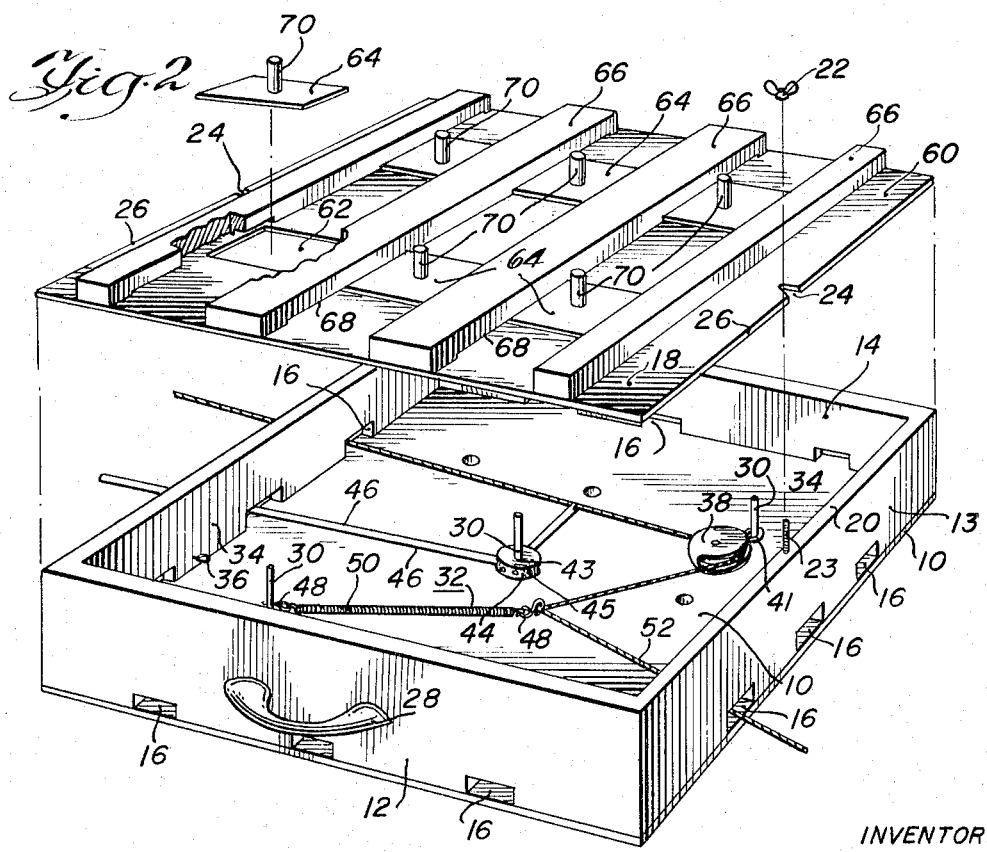

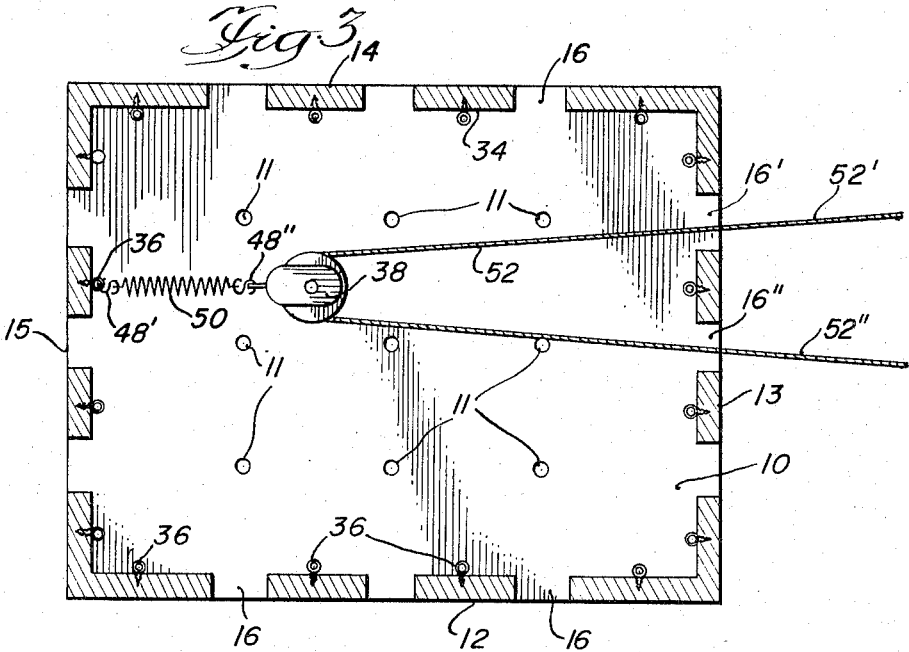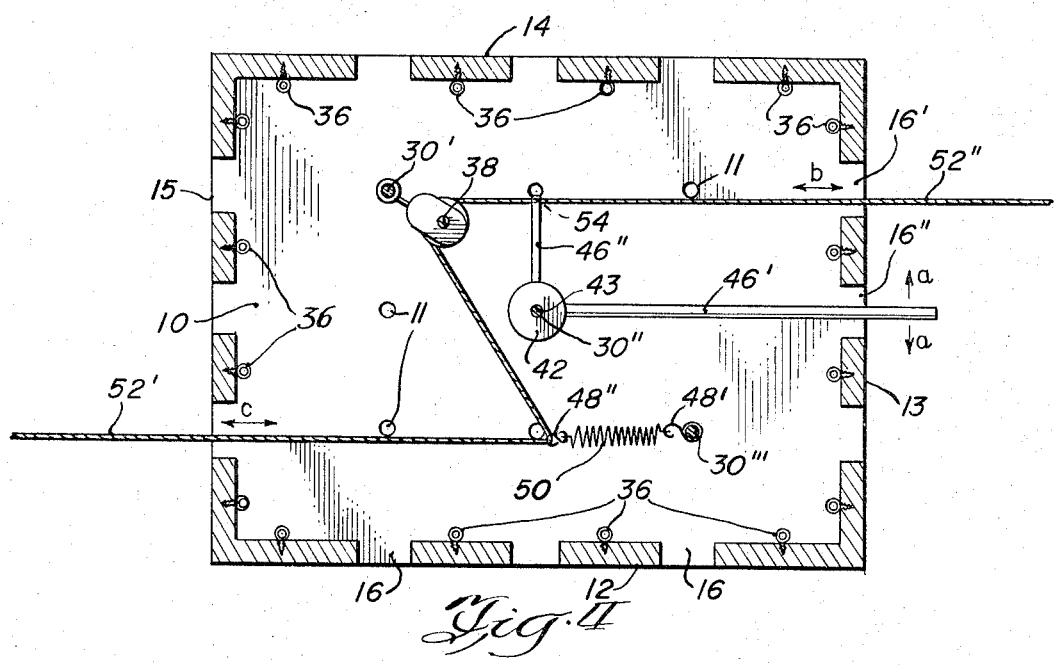

United States Patent Office 3,295,227
Patented Jan. 3, 1967

3,295,227
EDUCATIONAL DEVICE
Joseph Richard Suchman, 2915 Kanawha St. NW.,
Washington, D.C. 20015
Filed Sept. 18, 1964, Ser. No. 397,411
11 Claims. (Cl. 35—22)

This invention relates to an educational device which, as will be explained, may also be used for amusement purposes.

The invention has great utility in the field of inquiry training. "Inquiry" is the intellectual process by which man pursues the extension of his own knowledge and understanding through search, investigation and reflection. It involves such activities as observation, analysis, data gathering, data processing, theory building and theory testing. "Inquiry training" means the teaching of inquiry skills through the use of specific teaching methods and teaching or learning materials, as opposed to merely teaching content. It consists of those pedagogical procedures designed to stimulate, support and strengthen those skills, attitudes and cognitive strategies that promote the power and productivity of inquiry.

The teaching of inquiry skills is one important use of the novel device of the present invention. The device is constructed so that its user will rely on a combination of three senses—proprioceptive (body position), tactile (pressure), and kinesthetic (motion)—to try to determine the structural linkage between an input force and a resultant output effect, and will also employ the auditory sense to help identify the nature of that structural linkage.

In the present invention a mechanical assembly of interconnected elements is at least partially concealed, so that movement of the elements and any resulting sounds caused by a force applied by the user of the device against a portion of one of the elements will pose a problem that requires the use of inquiry skills for its solution. Probing or pulling forces produced by the user can be applied to one or more of the concealed, mechanically linked elements. The resulting movement of the elements, though partially concealed, is reflected in movement of those portions of the elements that are not concealed, and these latter movements, observable as they are by the user together with any sounds heard, pose the problem.

The device includes a base to which a plurality of linkage supporting members can be affixed, and a plurality of mechanical elements which can be interconnected with one another to form a mechanical linkage, and which can be connected to the supporting members, with at least a portion of the mechanical linkage concealed from view. In the embodiment disclosed, a cover is provided to conceal the linkage of mechanical elements from the subject, so that he may hypothesize, from observing the relationships between the input force applied to the elements and the output result, what mechanical elements have been assembled on the base, their positions, and the relationships in which they have been assembled.

In one embodiment of the invention, a board having a surface which defines a plurality or recesses (commercially known as a "pegboard") is utilized as the base, and pegs are used to support the interconnected mechanical elements. A plurality of side walls are provided, at least one of which defines one or more apertures for allowing the user to have access to the concealed mechanical elements. For example, a probing tool may be inserted through the aperture with exploratory sweeps by the user to try to determine what element is present within the device and where it is located. Or the probing tool may be pressed against one of the mechanical elements within the device to see what kind of response results. The apertures also allow a portion of one or more of the elements to extend therethrough, thereby enabling the operator to apply a force to the elements without being able to directly observe the basic linkage.

In one form of the invention, the cover which conceals the mechanical linkage is supported by and connected to the side members to form a substantially enclosed unit. If desired, the concealing cover may be provided with devices to enable the subject to view a portion of the mechanical linkage during operation of the device.

A more detailed explanation of the invention is contained in the following description and by reference to the drawings, which show, by means of an illustrative embodiment, the basic principles of the invention and a contemplated mode of applying those principles.

In the drawings:

FIGURE 1 is a perspective view of an educational device forming an illustrative embodiment of the present invention;

FIGURE 2 is an exploded view thereof;

FIGURE 3 is a sectional view in plan of the embodiment of FIGURE 1, showing one of the numerous problems that may be constructed;

FIGURE 4 is a sectional view in plan similar to FIGURE 3, showing another of the numerous problems that may be constructed;

Figure 5:
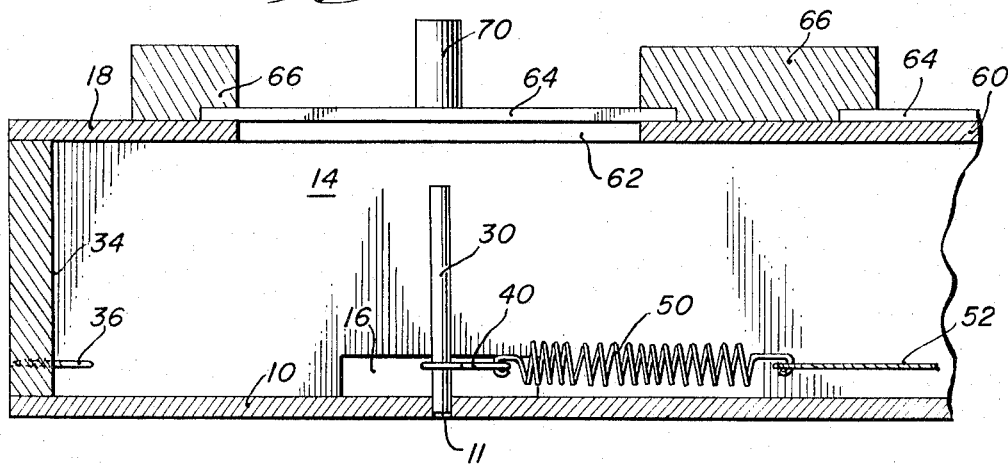
FIGURE 5 is a fragmentary sectional view taken along the lines 5—5 of FIGURE 1.
Figure 6:
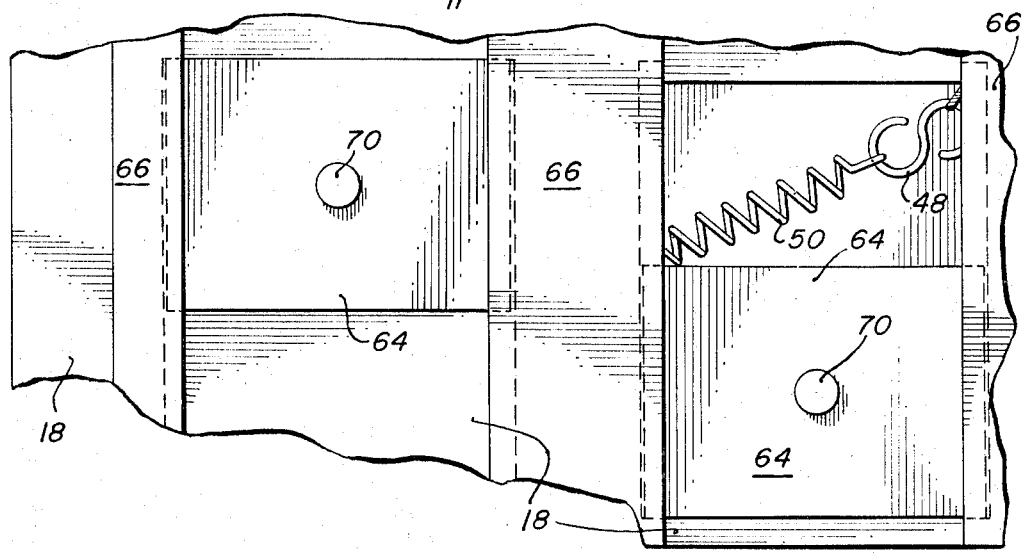
FIGURE 6 is an enlarged, fragmentary plan view, showing one of the viewing apertures covered by the sliding panel and one of the viewing apertures uncovered.

An educational device forming an illustrative embodiment of the present invention is shown in FIGURES 1–6. With reference to FIGURES 1 and 2, the device is shown in the form of an enclosed box 8 adaptable for ready carriage.

The device includes a base 10 having a plurality of holes 11, sometimes known commercially as "pegboard." The holes may extend partially or all the way through the base. Extending from the base 10 are four side members 12, 13, 14, 15 defining apertures 16 and extending perpendicularly with respect to the base. A cover 18 is provided to enclose the contents and is supported by the top side 20 of the side members. As shown most clearly in FIGURE 2, the cover is connected to the side members by means of wing nuts 22 and bolts 23 which extend through grooves 24 formed at the sides 26 of the cover 18. A handle 28 is affixed to member 12 so that the device may be easily carried.

Base holes 11 are formed to snugly receive pegs 30 which are inserted at strategic positions on the base 10 to support a linkage of interconnected mechanical elements 32.

The inner walls 34 of the side members 12–15 have eye-hooks 36 positioned intermediate apertures 16. Eye-hooks 36 are utilized to provide a support for certain arrangements of interconnected mechanical elements.

Numerous different combinations of interconnected elements, at least some of which are positionally movable with respect to each other, may be used to form a linkage assembly capable of effective utilization in the present invention. For example, the mechanical elements could include pulleys, spools, dowels, springs, and filaments. As used herein, the term "filament" is defined as an elongated flexible strand composed of either a textile material, plastic or metal. A "positionally movable" element is defined herein as an element that can be taken from one general location or position within the device and moved therefrom, to another general location or position within the device or elsewhere.

The pulleys 38 have a hook 41 connected thereto for placement about a peg 30. Spool 42 is formed of a disc having an aperture 43 extending through its axis, and having a grooved side 44 with several recesses 45 radially drilled into the circumference of the wall defined by the groove and extending in a direction perpendicular to the axis. Aperture 43 is slightly larger than the diameter of a peg 30 so that spool 42 can be rotatably supported by the peg, and the recesses 45 are of a size to snugly receive dowels 46 that are inserted therein.

To interconnect the mechanical elements, S-hooks 48 are provided with at least one side of the S preferably being larger than peg 30 so that it can be pivotally supported by the peg. The S-hooks can be used to connect a spring 50 to a peg as shown in FIGURE 5, or to connect a spring to a portion of filament 52 or to an eye-hook 36. Some of the dowels 46 have longitudinal recesses 54 at their ends to snugly receive a portion of the filament, so that the filament is moved upon movement of the dowels.

The cover 18 comprises a board 60 defining a plurality of viewing openings 62 which can be either covered by slides 64 or can remain open for viewing the box interior. The viewing openings 62 are preferably vertically aligned with holes 11 when the cover 18 is connected to the side members, so that the elements connected adjacent a particular hole can be viewed when desired.

To accommodate the slides 64, a plurality of beams 66 having grooves 68 on their undersurfaces are provided and are connected to the board 60. The beams 66 are positioned so that the slides 64 are confined within the grooves 68. Posts 70 are connected to the slides for manual grasping by the operator so that he can easily move the slides within the grooves. If viewing is not desired, a cover comprising a plain board without the openings and slides can be used.

A great number of mechanical linkages can be constructed, and two of such linkages are shown in FIGURES 3 and 4.

In FIGURE 3 a spring 50 is connected to an eye-hook 36 via an S-hook 48′, and a second S-hook 48″ on the other side of the spring connects a pulley 38 thereto. A filament 52 is connected to the pulley 38 having both ends 52′ and 52″ extending through different apertures 16′ and 16″ of the side member 13. In this embodiment, none of pegs 30 are used, but are of course available if desired.

In the construction shown in FIGURE 4, three pegs 30′, 30″ and 30‴ are inserted into the respective holes. A pulley 38 is connected to peg 30′, a spool 42 is connected to peg 30″ and a spring 50 is connected to peg 30‴ by means of S-hook 48′. A long dowel 46′ is inserted into one of the recesses 45 of the spool 42 and extends through an aperture 16 of the side wall. A shorter dowel 46″ having a recess 54 at the end thereof is connected to another recess 45 of the spool 42 and the filament 52 is extended through one of the apertures 16, fitted into the recess 54 of the dowel 46″, positioned about the pulley 38, connected to the spring 50 via S-hook 48″ and extended out of another aperture 16. In this embodiment none of the eye-hooks 36 are utilized but are available for use when desired.

In the operation of the device, the desired linkage is constructed by a teacher and the cover 18 is connected to the side members to form an enclosed box having the mechanical linkage concealed from the subject. As used herein "teacher" connotes anyone who constructs the desired linkage for the operator. The subject or operator then applies a force to at least a portion of the concealed linkage by either inserting a probe into the box or by applying the force directly to one of the elements which extends outside of the box. By observing the effect on another element or on the contacted element itself, the subject hypothesizes the linkage contained within the box.

Ordinarily much information can be acquired by probing. For example, the subject can discover the location of the elements by noting the length of the probe insertion and the angle of the probe. The probe can be inserted into different apertures, and the subject could use coordinates to specify the location of the element. The type of element present can be hypothesized in response to the proprioceptive feel and/or the auditory response. A spring, for example, would display a spring tension and might also emit a familiar squeak when pulled or a metallic sound when struck.

Figure 7:
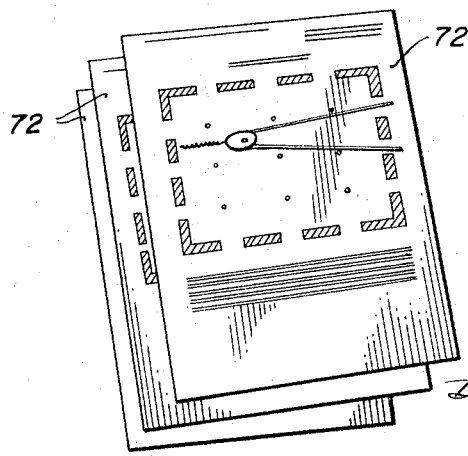
FIGURE 7 is a perspective view of record sheets that may be utilized with the present invention.

If the FIGURE 3 construction is utilized, the subject, by pulling one end of the filament 52 can visually observe opposite directional movement of the other filament end. Additionally, by pulling both ends of the filament, a spring tension will be observed. Hence the subject may reason that a pulley and spring are utilized. As shown in FIGURE 7, work sheets 72 having cross-sectional diagrams of the device are provided, and the subject may drew on these sheets what he thinks is present within the box.

In the arrangement illustrated in FIGURE 4, lateral movement of the dowel 46′ in the direction of arrows *a* will cause movement of both ends of the filament in approximately the directions of arrows *b* and *c*. Conversely, movement of either end of the filament will cause lateral movement of the dowel 46′ in addition to movement of the filament. A spring tension will be felt when the filament end 52′ is pulled in addition to visual observation of the movement of the dowel 46′ and the other filament end 52″.

The concealed mechanical elements may be observed, at the option of the teacher who is carrying out the inquiry training, by means of slides 64. If the person using the device has difficulty with a given problem, the teacher may wish to move one or more slides to allow visible access to portions of the linkage.

The slides also provide a means for an effective inquiry test whereby the subject is to hypothesize what he will see when the slide is moved to open position. His score can be computed on the basis of the number of correct predictions he can make compared to the number of slides opened.

From the foregoing, it is apparent that the device of the present invention is well suited for use in the inquiry training field. The device effectively enables the teaching of structure-function relationships and the testing of a subject by posing problems requiring solutions. During operation of the device, the process of inquiry is applied to a problem in which an essential part of the cause and effect relationship being explored is concealed or otherwise not capable of direct discovery. The concealment expedient stimulates inquiry and requires observation, analysis, data gathering, data processing, theory building and theory testing by the subject.

The device of the present invention may be utilized as a thought-provoking game as well as an inquiry training and/or testing apparatus. Numerous other modifications and substitutions may become apparent with respect to the present invention, but it is to be understood that the embodiment depicted in the drawings is for illustrative purposes only and that the scope and purposes of the present invention include modification of the illustrated device.

What is claimed is:

1. An educational device for use by a teacher and an operator which comprises: a base; supporting means adapted to be connected to said base; a plurality of mechanical elements, at least some of which are positionally movable with respect to each other, adapted to be interconnected with one another and to be supported by said supporting means in a plurailty of ways to form a mechanical linkage, all in a predetermined way selected from among said plurality of ways by the teacher who employs the device; and means for at least partially concealing the interconnected assemblage of elements and their linkage from the operator.

2. An educational device for use by a teacher and an operator which comprises: a base; supporting means adapted to be affixed to said base; a plurality of mechanical elements including a pulley, a spring and a filament, at least some of which are positionally movable with respect to each other, adapted to be interconnected with one another and to be supported by said supporting means in a plurality of ways to form a mechanical linkage, all in a predetermined way selected from among said plurality of ways by the teacher who employs the device; and means for at least partially concealing the interconnected assemblage of elements from the operator.

3. The educational device for use by a teacher and an operator of claim 1 wherein said mechanical elements include a spool defining a hole therethrough in the direction of its axis for rotation about said supporting means, said spool further defining a plurality of recesses extending along the line of a plane which is substantially perpendicular to the spool axis for insertion of a dowel thereinto.

4. An educational device for use by a teacher and an operator which comprises: a base; a plurality of supporting members adapted to be connected to said base; a plurality of side walls extending substantially perpendicular to said base, at least one of said side walls defining at least one aperture; a plurality of mechanical elements, at least some of which are positionally movable with respect to each other, adapted to be interconnected with one another and to be supported by said supporting members in a plurality of ways to form a mechanical linkage, all in a predetermined way selected from among said plurality of ways by the teacher who employs the device; at least one of said elements extending through said aperture and being adapted for contact by the operator; and means for concealing the linkage from the operator except for at least a portion of said one element adapted for operator contact, thereby enabling the formulation of a hypothesis on the basis of the output effect resulting from the input force applied to said one element.

5. An educational device for use by a teacher and an operator which comprises: a board having a surface which defines a plurality of holes; a plurality of pegs adapted for insertion into said holes with a snug fit; a plurality of side walls extending substantially perpendicular to said board, at least one of said walls defining at least one aperture, a plurality of mechanical elements, at least some of which are positionally movable with respect to each other, adapted to be interconnected with one another and to be supported by said pegs in a plurality of ways to form a mechanical linkage, all in a predetermined way selected from among said plurality of ways by the teacher who employs the device; at least one of said elements extending through said aperture and being adapted to be contacted by the operator, and means adapted for support by at least two of said side walls for concealing said linkage from the operator except for at least a portion of said one element, thereby enabling the formulation of a hypothesis on the basis of the output effect resulting from the input force applied to said one element.

6. An educational device for use by a teacher and an operator which comprises: a board having a surface which defines a plurality of holes; a peg adapted to be inserted into said holes with a snug fit; a plurality of side walls extending from said board, at least one of said side walls defining at least one aperture, a plurality of mechanical elements, at least some of which are positionally movable with respect to each other, adapted to be interconnected with one another and to be supported by said peg in a plurality of ways to form a mechanical linkage, all in a predetermined way selected from among said plurality of ways by the teacher who employs the device; at least one of said mechanical elements being adapted to extend through said aperture and be positioned for contact by the operator; means adapted for connection to said side walls for concealing said linkage during operation of the device; and means connected to said concealing means for enabling observation of a portion of said board during operation of said device.

7. An education device for use by a teacher and an operator which comprises: a base; a plurality of side walls extending from said base, at least one of said side walls defining at least one aperture, an eye-hook connected to one of said side walls, a supporting member adapted to be connected to said base; a plurality of mechanical elements, at least some of which are positionally movable with respect to each other, adapted to be interconnected with one another and to be supportingly connected to said eye-hook and to said supporting member in a plurality of ways to form a mechanical linkage, all in a predetermined way selected from among said plurality of ways by the teacher who employs the device; at least one of said elements being adapted to extend through said aperture and be positioned for contact by the operator; and means for concealing the linkage from the operator except for at least a portion of said one element adapted for operator contact.

8. An educational device for use by a teacher and an operator which comprises: a base; a plurality of side walls extending from said base, at least one of said side walls defining at least one aperture, at least one supporting member connected to at least one of said side walls, a plurality of mechanical elements, at least some of which are positionally movable with respect to each other, adapted to be interconnected with one another and to be supported by said supporting member in a plurality of ways to form a mechanical linkage, all in a predetermined way selected from among said plurality of ways by the teacher who employs the device; at least one of said elements being adapted to extend through said aperture and be positioned for contact by the operator; and means partially concealing the linkage from the operator.

9. An educational device for use by a teacher and an operator which comprises: a base; a plurality of side walls extending from said base, at least one of said side walls defining at least one aperture, at least one eye-hook connected to at least one of said side walls, a plurality of mechanical elements, at least some of which are positionally movable with respect to each other, adapted to be interconnected with one another and to be supported by said eye-hook in a plurality of ways to form a mechanical linkage, all in a predetermined way selected from among said plurality of ways by the teacher who employs the device; at least one of said elements being adapted to extend through said aperture and be positioned for contact by the operator; and means for concealing the linkage from the operator except for at least a portion of said one element adapted for operator contact, thereby enabling the formation of a hypothesis on the basis of the output effect resulting from the input force applied to said one element.

10. An educational device for use by a teacher and an operator which comprises: a base; a plurality of supporting members adapted to be connected to said base; a plurality of mechanical elements, at least some of which are positionally movable with respect to each other, adapted to be interconnected with one another and to be supported by said supporting members in a plurality of ways to form a mechanical linkage, all in a predetermined way selected from among said plurality of ways by the teacher who employs the device; and means for concealing said linkage from the operator except for at least a portion of one element which is adapted to be contacted by the operator, thereby enabling the formulation of a hypothesis on the basis of the output effect resulting from the input force applied to said one element.

11. An educational device for use by a teacher and an operator which comprises: a base; a plurality of supporting members connected to said base; a plurality of side walls extending substantially perpendicularly from said from said base, at least one of said side walls defining at least one aperture; a plurality of mechanical elements, at least some of which are positionally movable with respect to each other, adapted to be interconnected with one another and to be supported by said supporting members in a plurality of ways to form a mechanical linkage, all in a predetermined way selected from among said plurality of ways by the teacher who employs the device; at least one of said elements of said mechanical linkage extending through said aperture; and means partially concealing the interconnected assemblage of elements from the operator except for at least a portion of said one element.

References Cited by the Examiner
UNITED STATES PATENTS

| | | | |
|---|---|---|---|
| 731,309 | 6/1903 | Kilbours | 36—39 X |
| 1,789,896 | 1/1931 | Gilbert | 46—39 X |
| 2,108,430 | 2/1938 | Cookson | 35—8 |
| 2,396,382 | 3/1946 | Mailbaum. | |
| 2,709,318 | 5/1955 | Benjamin | 46—23 X |
| 2,885,793 | 5/1959 | Oback et al. | 35—13 |
| 2,952,081 | 9/1960 | Wiken | 35—13 |

EUGENE R. CAPOZIO, *Primary Examiner.*

W. GRIEB, *Assistant Examiner.*